United States Patent
Lei et al.

(10) Patent No.: US 8,456,138 B2
(45) Date of Patent: Jun. 4, 2013

(54) PROGRAMMABLE HIGH VOLTAGE ENERGY SAVING SYSTEM

(75) Inventors: Xishe Lei, Changzhou (CN); Xiao Bao Wang, Changzhou (CN)

(73) Assignees: MacMic Science & Technology Co., Ltd., Changzhou (CN); Luxtech 360 LLC., Cincinnati, OH (US)

( * ) Notice: Subject to any disclaimer, the term of this patent is extended or adjusted under 35 U.S.C. 154(b) by 344 days.

(21) Appl. No.: 12/836,225

(22) Filed: Jul. 14, 2010

(65) Prior Publication Data

US 2012/0013271 A1    Jan. 19, 2012

(51) Int. Cl.
*H02P 11/00*    (2006.01)
*H02P 9/00*    (2006.01)

(52) U.S. Cl.
USPC .................. 322/24; 322/28; 322/44; 322/46; 322/59; 322/89

(58) Field of Classification Search
USPC ............................... 322/24, 28, 44, 46, 59, 89
See application file for complete search history.

(56) References Cited

U.S. PATENT DOCUMENTS

| | | | | |
|---|---|---|---|---|
| 5,939,908 A | * | 8/1999 | Moore et al. | 327/108 |
| 6,020,735 A | * | 2/2000 | Barnett et al. | 324/133 |
| 6,856,495 B2 | * | 2/2005 | Ely | 361/18 |
| 8,030,905 B2 | * | 10/2011 | Petkov | 322/46 |
| 2010/0007312 A1 | * | 1/2010 | Petkov | 322/44 |

* cited by examiner

*Primary Examiner* — Bao Q Vu
(74) *Attorney, Agent, or Firm* — Douglas E. MacKenzie; Alfred Xin

(57) ABSTRACT

A programmable system includes a first level protection circuit comprised of discharge tube CR1/ CR2 and piezoresistor MOV1/MOV2 in series; a second-level protection circuit comprised of the series arm of capacitor C1 and resistor R1 in parallel with a transient voltage suppression diode TVS1, and inductors L1/L2 connected to the ends of first level and second-level protection circuits respectively. A control circuit includes a PWM driver module and a SCM. The PWM driver module is connected to the PWM control port of the SCM and its output is connected to an IGBT module. The control circuit is also connected to a series communication module and to a user interface. The features of the invention are: strong-shock resistance; a wide range of load adaptability; and ability of accurately and steplessly regulating and adjusting with high frequency and high power load.

3 Claims, 9 Drawing Sheets

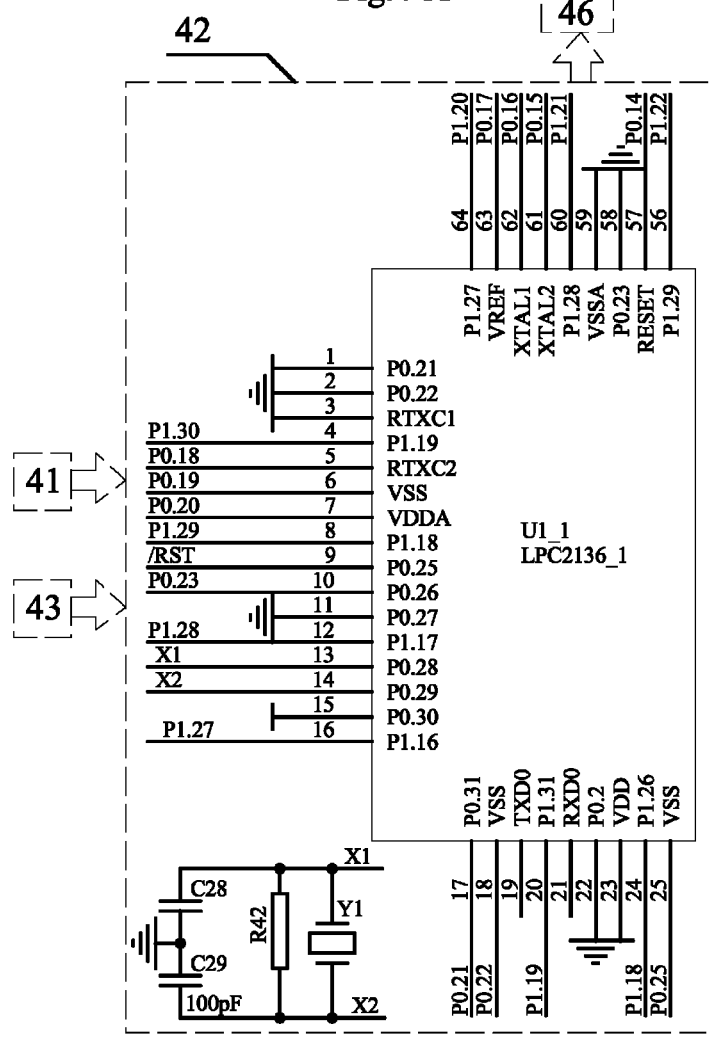
Fig.4-A

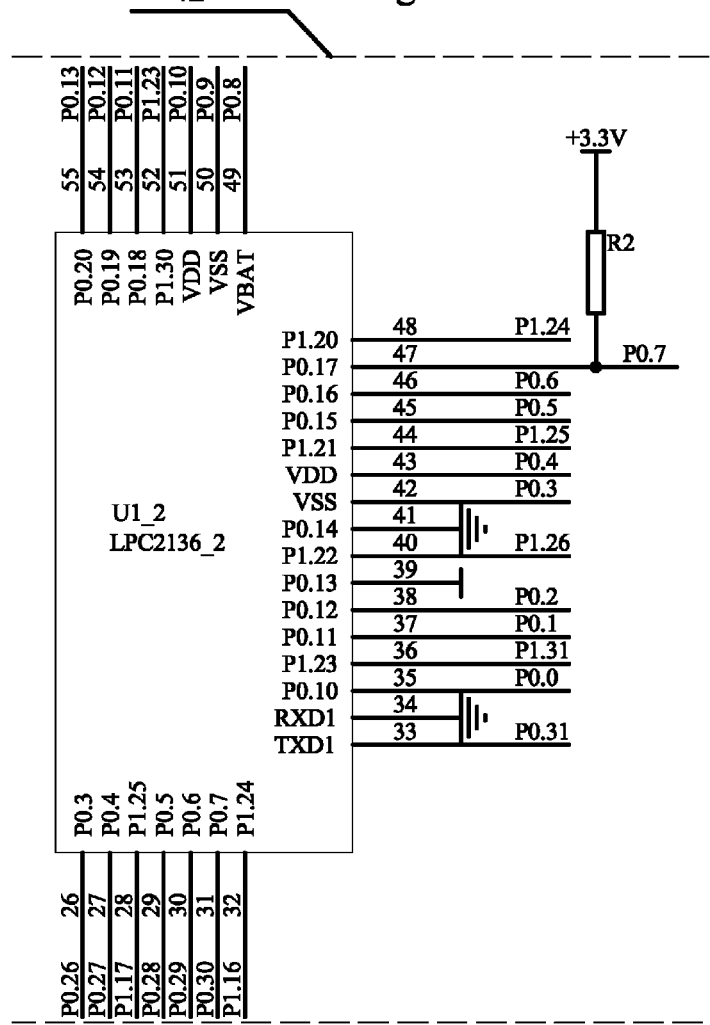
Fig.4-B

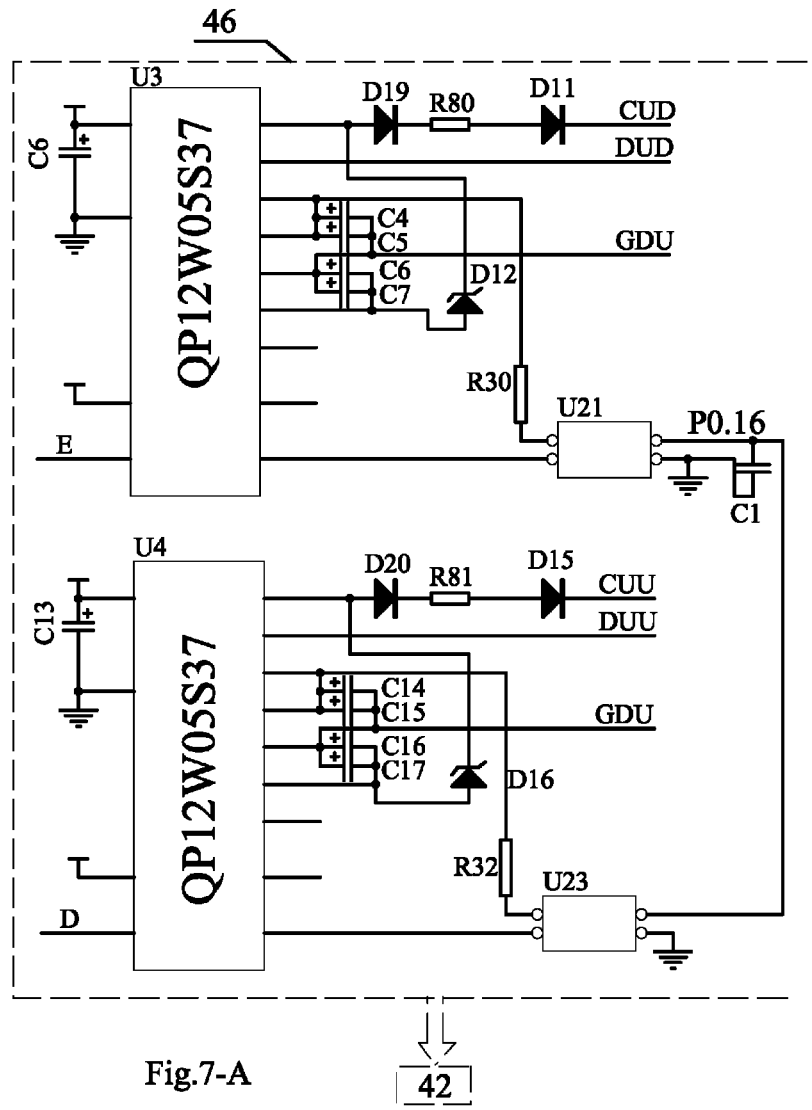
Fig.7-A

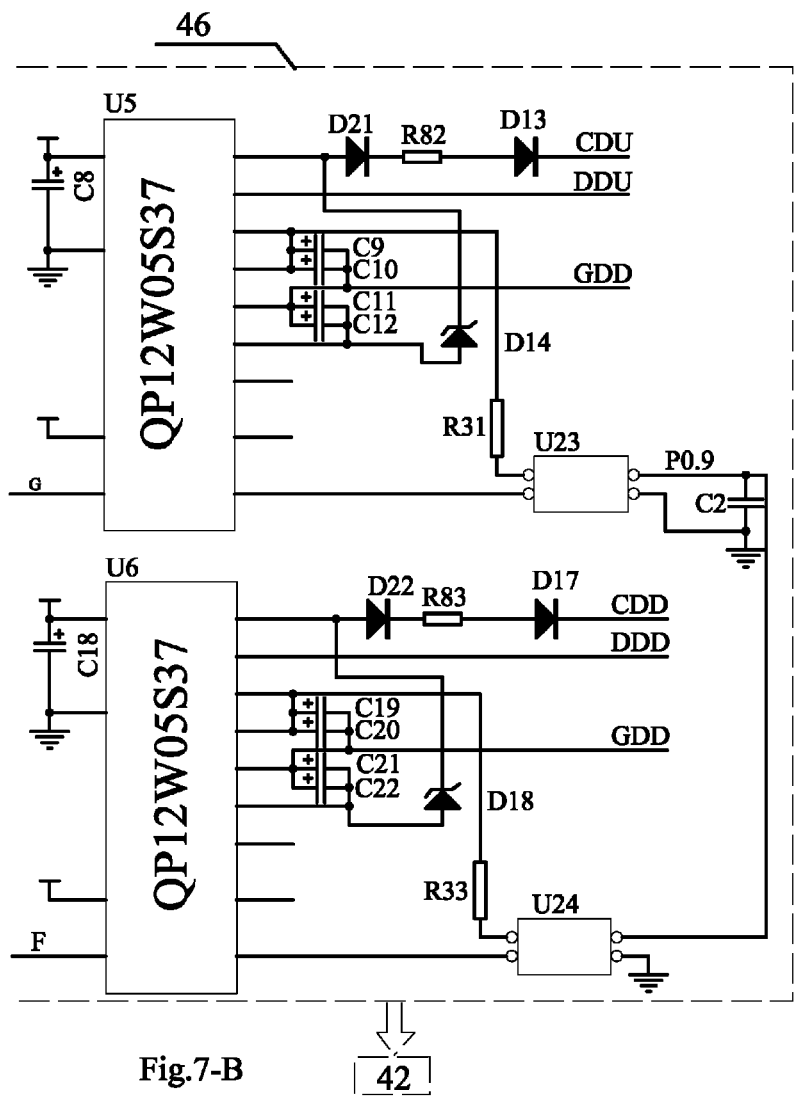
Fig.7-B

PROGRAMMABLE HIGH VOLTAGE ENERGY SAVING SYSTEM

TECHNOLOGY FIELD

The invitation is related to flexible energy saving lighting power supply, and therefore related to lighting power supply technology field.

BACKGROUND OF TECHNOLOGY

Green energy is to save energy on the premises of ensuring or and improving the lighting quality and efficiency; and to reduce the consumption of non-renewable resources and ecological and environmental pollutions. Not only green energy engineering aims at to improve the efficiency of lighting source, but also implement energy saving procedures throughout the lighting supply systems in order to improve energy-usage efficiency. Currently known lighting energy saving power supply devices available in the market are as follows:

1. Devices Based on Transformers

This kind of products currently dominates the market, and is popular in lighting energy saving improvement, and there are a few products available:

A. Electromagnetic self-coupled transformer fixed tap mechanical switch device: The device is cumbersome and incapable of voltage and luminance-regulation with load, it has fixed energy saving rate and is incapable of luminance-regulation.

B. Electromagnetic self-coupled transformer tap SCR switch device: the device is cumbersome, and it is of mutation type voltage and luminance-regulation, it may lead to the damages and lights-off on HID lamps, and it is incapable of accurate luminance-regulation, common-mode conduction exists during multiple SCR switch operation, which leads to high fault rate.

C. Electromagnetic self-coupled transformer step-less carbon brush switch device: the device is also cumbersome, and may generate electrical sparks during carbon brush sliding under heavy current, which leads to short service life and high fault rate.

D. Electromagnetic self-coupled transformer motor servo step-less carbon brush voltage and luminance-regulation device: it is cumbersome, and is of low efficient and high noise.

2. SCR control device: The device may generate large input current harmonic wave and cause power system pollution; serious distortion on voltage output which causes EMI; only adaptive to inductive lighting load, not capable to meet the requirement of lighting diversification or industrial regulations.

3. Power-electronic power supply transformation devices: the devices achieve the AC power conversion by power-electronic devices, and it is of power supply optimization devices. The advantages of such devices are: adopting new technology, excellent output characteristics, light and handy, artificially intelligent, they represent a direction of developing energy saving systems.

However this kind of products available in the market now has several disadvantages: complicated topology, low-power capacity, poor reliability and efficiency, poor over-voltage resistance, small-range load adaptability (especially for inductive and capacitive load). Ability of resisting lightening strike, over-voltage and power surge is still a problem. Asymmetry of IGBT module structure leads to difficulty on power expansion and regional electrical stress.

SUMMARY OF THE INVENTION

This invention aims at providing a flexible energy saving lighting power supply system that is: strong shock resistance, wide range of load adaptability, capable of steplessly accurate voltage regulation under high load flexible energy saving lighting power supply device.

To achieve the goals defined above the system should have features and functions including: an over-voltage protection circuit, a power regulation circuit, a control circuit, an Auxiliary power module, a serial communication module and user interface.

The over-voltage protection circuit includes a first level protection circuit composed by discharge tube CR1/CR2 and piezoresistor MOV1/MOV2 in series, and a second-level protection circuit composed by series arm of capacitor C1 and resistor R1 which is parallel with transient voltage suppression diode TVS1, and inductors L1/L2 connected to the ends of the first level and the second-level protection circuits respectively. And the common terminal of piezoresistors MOV1/MOV2 is connected to the ground;

The power regulation circuit includes IGBT module, a capacitor Ci connected to the input of the IGBT module and the output protection circuit connected to the output of the IGBT module. Ci is parallel with transient voltage suppression diode TVS1. The IGBT module is composed of high-frequency chopper T1/T2 and power frequency continued current tube T3/T4. The collectors of high-frequency chopper T1/T2 are connected to the ends of Ci, and the emitters of T1/T2 are connected to the collectors of T3 and T4 respectively. The anodes of diodes D1/D2 are anti-parallel connected to the collectors of T1/T2 respectively. The emitters of T3/T4 are forward connected in series with diodes D3 and D4 respectively. The output protection circuit includes transient suppression diode TVS2 and LC filter circuit. TVS2 is connected in parallel with the IGBT module.

The Auxiliary power module is connected to the power supply input of the control circuit. The control circuit includes the pulse width modulation (PWM) driver module and the single chip machine (SCM). PWM driver module is connected to the PWM control port of the SCM. The high frequency and power frequency linear output ports of PWM driver module are connected to the gates of T1/T2/T3/T4. The control circuit is also connected to the series communication module and user interface.

The advantages of the inventive design described above are as follows:

1. The IGBT module adapted for the power regulation circuit comprised of high frequency chopper T1, T2 and power frequency continued current tube T3, T4 to achieve high frequency AC/AC conversion and high frequency power steplessly accurate voltage regulation with load. Timing and registering-speed for voltage regulation may be programmed by users. The output is pure sinusoidal wave without harmonic wave, and therefore generates no pollution to power system. Adaptive both to capacitive and inductive loads as well as any AC load. The structure of the IGBT module applied to the said system has sound symmetry, heat dissipation and electromagnetic field homogenization; and its EMI effect is low; it is easy to handle power expansion, external function extensions and electronic stress during operation with such IGBT module.

2. The input of power regulation circuit is connected to the over-voltage protection circuit in this invention, to achieve second level lighting protection and system instant surge protection, to protect IGBT module and improve the operation reliability of the power supply. The power regulation circuit has output protection circuit at the output of the IGBT module; the induced over-voltage from input circuit is absorbed by the transient voltage suppression diode TVS2, so that goal of the dual protections from SCM software and hardware circuit is achieved, and the problem of inadequate shock resistance of the power supply device is also solved.

3. This invention utilizes SCM to adjust the duty ratio of the pulse width modulation of IGBT module. The power regulation circuit is controlled by the duty ratio D of the choppers, as to ensure constant current, voltage and power operation. Intelligent feature of the invention is achieved by embedding software with functions to control voltage, luminance and power supply in SCM, and the control functions may be configured according to users' application requirements.

4. This flexible energy saving lighting power supply system adopted single-phase modular design; it may be adapted to different power combination and serious unbalanced load. And the system is portable and light-weighted and highly efficient to operate; since the system has no mechanical or vulnerable components, it promises long-service lifetime, and the system also protects lighting equipments from over-voltage and power-surge and it is highly reliable to operate and function.

BRIEF DESCRIPTIONS OF THE DRAWINGS

Detailed descriptions on the operation example according to the attached figures are as follows.

Figure 3:
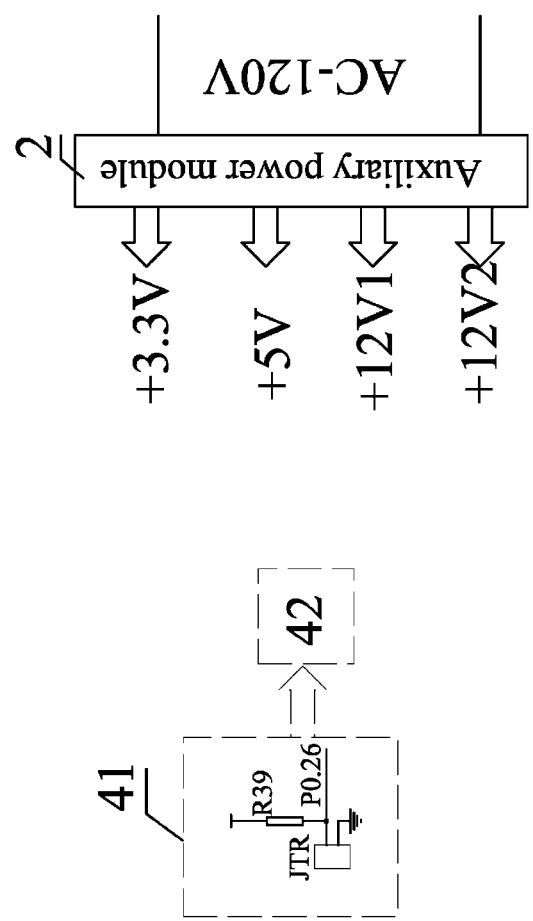
Figure 5:
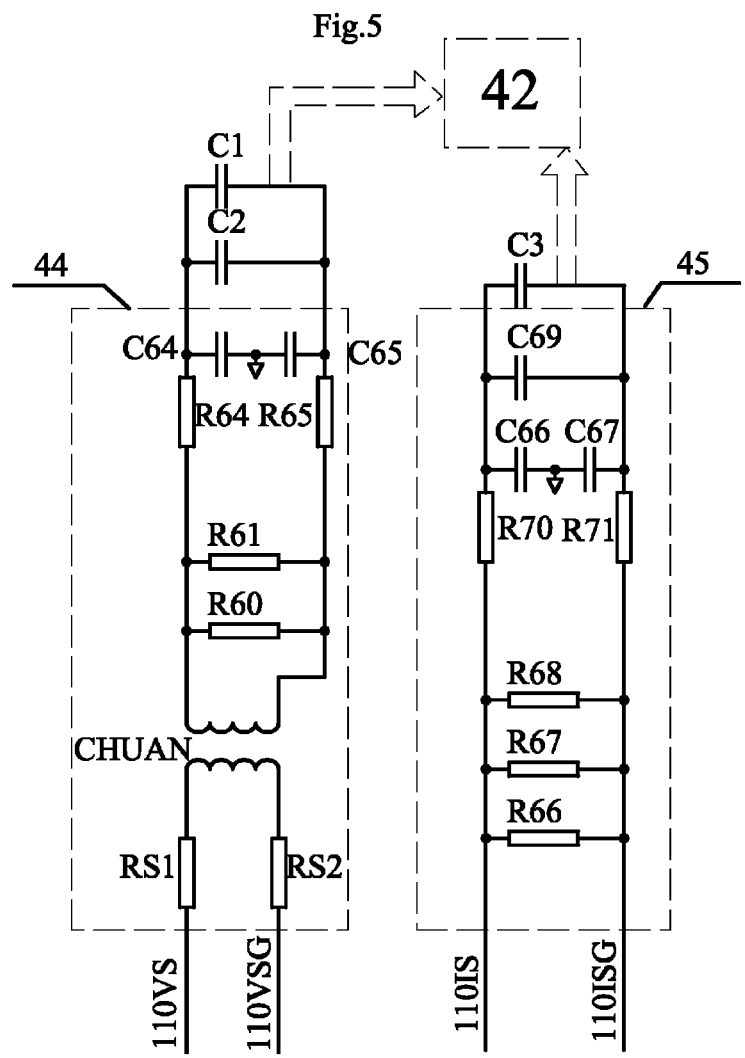
Figure 6:
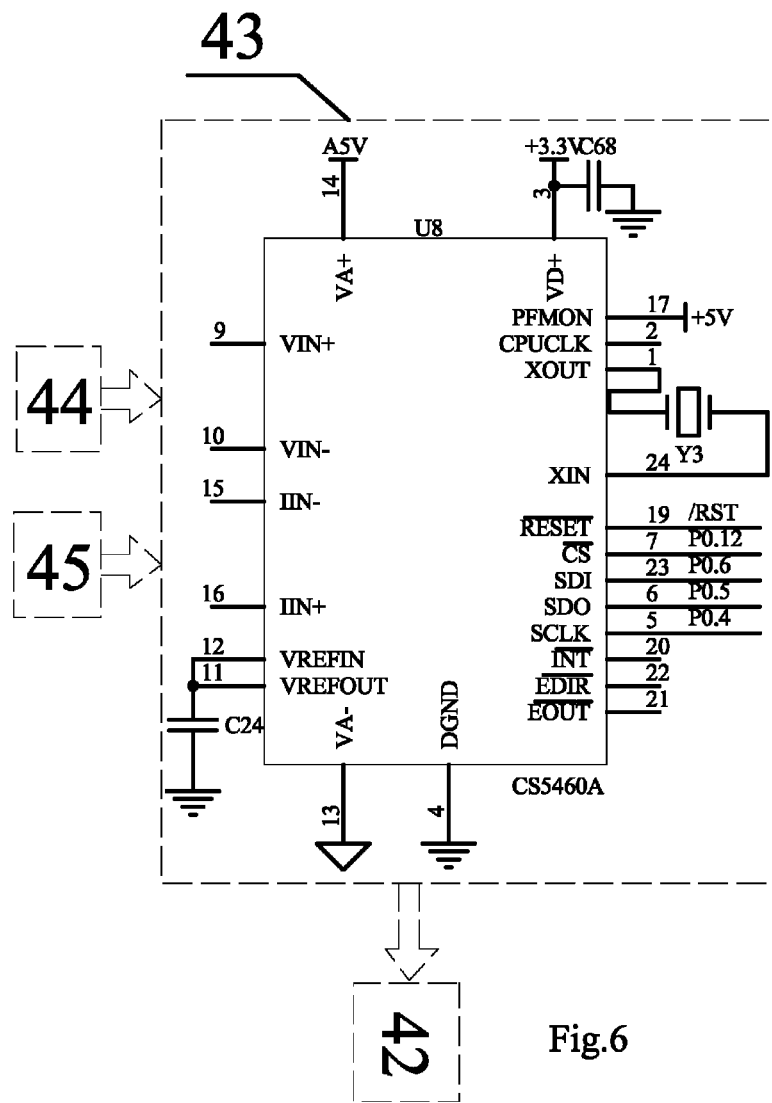

FIGS. 3, 4-A and 4-B, 5, 6, 7-A and 7B are the circuit diagram of control circuit of this invention.

Components numbering in the figures: 1—Over-voltage protection circuit, 2—Auxiliary power module, 3—Fan, 4—Control circuit, 41—temperature detection circuit, 42—SCM, 43—A/D conversion circuit, 44—Voltage sampling filter circuit, 45—Current sampling filter circuit, 46—PWM driver module, 5—Serial communication module, 6—User interface, 7—Power regulation circuit.

DETAILED OPERATION MANNER

Figure 1:
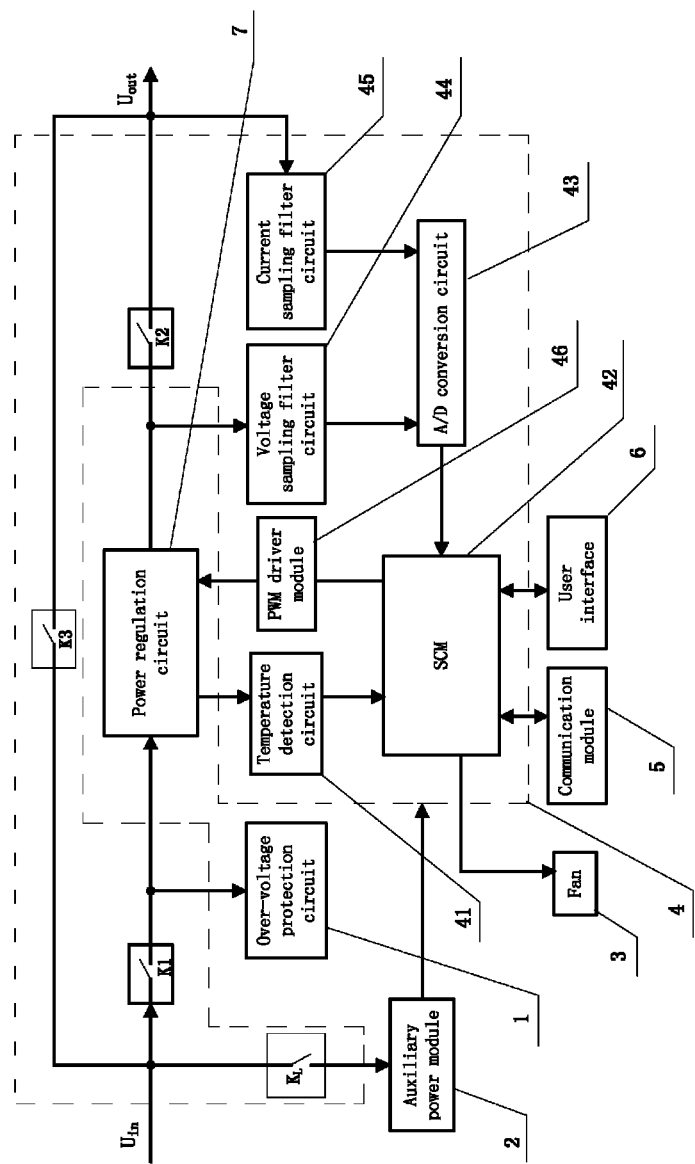
FIG. 1 is the block diagram of flexible energy saving lighting power supply system of this invention.
Figure 2:
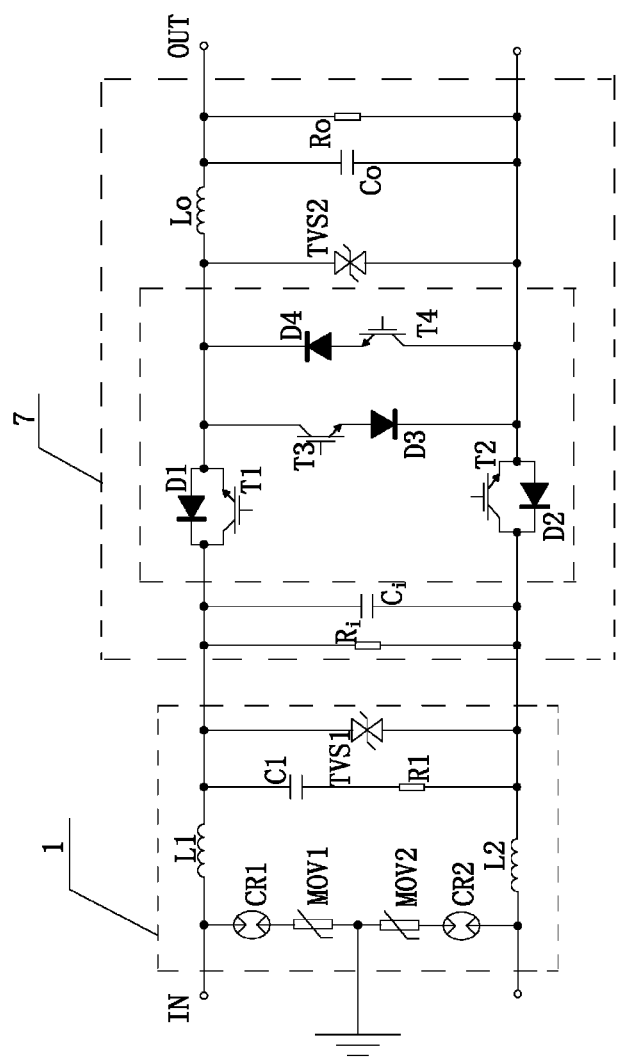
FIG. 2 is the circuit diagram of over-voltage protection circuit and power regulation circuit of this invention.

As illustrated in FIGS. 1 and 2, the flexible energy saving lighting power supply system of this invention includes: 1—Over-voltage protection circuit, 2—Auxiliary power module, 4—Control circuit, 5—Serial communication module, 6—User interface.

As shown in FIG. 2, the Over-voltage protection circuit 1 is connected to the input of power supply device. Over-voltage protection circuit 1 includes discharge tube CR1/CR2, piezoresistor MOV1/MOV2, capacitor C1, resistor R1, inductor L1/L2. TVS1, CR1, MOV1/MOV2 and CR2 are connected in series to form the first level protection circuit, to achieve first level lighting strike over-voltage and instant surge protection; C1 and R1 series arm is connected to TVS1 in parallel to form second level protection circuit, to achieve second level lightening strike, over-voltage and instant surge protection; L1 and L2 are connected to the first and second level protection circuit in parallel respectively; the common terminal of MOV1 and MOV2 are connected to the ground. The protection circuit 1 is configured to protect the IGBT module in power regulation circuit 7. TVS1 is composed of 4 B-directional transient voltage suppression diodes TVS with 30 KW rated power.

As shown in FIGS. 2, 3, 4-A and 4-B, 5, 6, 7-A and 7-B the power regulation circuit 7 of this invention includes a IGBT module, a capacitor Ci connected to input of the IGBT module in parallel and output regulation protection circuit connected to output of the IGBT module in parallel. These components configure a direct AC/AC conversion circuit. The Ci is connected to a TVS1 in parallel as to filter out the input current harmonic wave. Resistor Ri is connected to Ci in parallel, to release the energy stored in Ci when the power supply stops operating. The output protection circuit includes transient suppression diodes TVS2 and LC filter circuit. LC filter circuit is composed of connecting Lo and Co. Lo is used to transfer energy, follow current, filter out the current harmonic wave of IGBT module output; Co, other than filtering out the current harmonic wave of IGBT module output, also provides power to load to ensure continuous current on load end. As shown in FIG. 2, IGBT module of the system is composed of high frequency chopper T1/T2 and power frequency continued current tube T3/T4. The collectors of T1 and T2 are connected to the ends of Ci, and their emitters are connected to the collectors of T3 and T4, respectively. The anodes of diodes D1/D2 are anti-parallel connected to the collectors of T1/T2 respectively. The emitters of T3/T4 are forward connected in series with diodes D3/D4 respectively. The reverse cut-off voltage protection to choppers and continued current tubes is done by these diodes, as to enable IGBT module symmetry and good heat dissipation. Transient voltage suppression diode TVS2 is connected in parallel with the IGBT module. In the implementation of this invention, the IGBT module has multiple rated currents, for example, 300 A/200 A/150 A/100 A/80 A/50 A etc. When control circuit 4 gives enabling signal to power regulation circuit to start voltage regulation operation and the input voltage waveform is in positive half cycle, T1 does chopping work, and T4 opens continuous current while T3 is shutoff, and T2 is open. When the input voltage waveform is in negative half cycle, T2 does chopping work, and T3 opens continuous current while T4 is shutoff, and T1 is open. The path back to power system is provided to the current when there is phase difference between voltage and current waveforms.

As shown in FIGS. 1 to 7-B, the input of Auxiliary power module 2 is connected to the input end of this power supply device while its output is connected to the input of control circuit 4. Control circuit 4 includes PWM driver module 46 and SCM 42. Auxiliary power module 2 provides multiple operation voltage to different parts of control module 4. Control circuit 4 has current leakage switch $K_L$. The ends of $K_L$ are connected to the input of K1 and the input of Auxiliary power module 2. The auxiliary power module of this invention could be implemented with conventional circuit and SCM 42 is configured with Philips-Arm-Ipc2136 embedded with flexible energy-saving lighting power supply software. PWM driver module is comprised of IC chips U2, U3, U4, U5 connected to optocouplers and peripheral circuits. The IC chip in implementation of this invention is M57962L. The high frequency/power frequency linear PWM outputs of PWM driver module 46 are connected to the gates of T1/T2 and T3/T4 respectively. SCM 42 with software algorithm, provides two way high frequency/power frequency linear PWM control signal by utilizing FPGA. The PWM driver module 46 controls T1/T2 to open and shut off with high frequency linear PWM control signal, and controls T3/T4 to open and shut off with power frequency linear PWM control signal. The chopping operation is controlled by high frequency PWM signal, the input/output only contain high frequency harmonic current. The harmonic current could be filtered out by a filter circuit, as result the input/output is pure sinusoidal current without harmonic wave, which will cause no pollution to power system and is capable of handling multiple types (inductive and capacitive) lighting loads. The control circuit 4 of this invention is connected to series communication module 5 and user interface 6. The series communication module 5 adopts RS-232/485 bus. This is conventional device; it is capable of receiving SMS commands from mobile phone or commands/parameters from control center, "time-voltage" list for example, and also is capable of updating current/voltage/temperature parameters. The implementation of user interface 6 is achieved by film button and rear projection LCD. Double-line character display, buzzer and alarm are provided to achieve good human-computer interaction and field parameter setting, information display and inquiry.

As shown in FIGS. 1, 3 to 7-B, the control circuit of this invention has detection protection circuit which includes fault bypass circuit, voltage sampling filter circuit 44, current sampling filter circuit 45 and temperature detection circuit 41. As shown in FIG. 1, fault bypass circuit includes switches K1 K2 and K3, in which K1 and K2 are connected to the input and output of power regulation circuit 7 respectively, and K3 is cross connected to the input of K1 and the output of K2 respectively. Switches K1 and K2 are closed and K3 is open in energy saving mode, to make the high frequency choppers T1/T2 and power frequency continued flow tube T3/T4 in IGBT module working. When fault is detected in power regulation circuit 7, K3 is closed, K1 and K2 are open, power supply device quits operation, and the bypass circuit is activated that allows continuation of power supply without interruption. In this implementation, K1 K2 and K3 are solid-state relays.

As shown in FIGS. 1, 3 to 7-B, the input of voltage sampling filter circuit 44 is connected to the output of power regulation circuit; the input of current sampling filter circuit 45 is connected to the output of K2; and the outputs of circuit 44 and 45 are connected to SCM 42 through A/D conversion circuit 43. The voltage sampling filter circuit 44 and current sampling filter circuit 45 are used to detect the voltage and current data of power regulation circuit 7. The data are transferred to SCM 42 after A/D conversion. If voltage and current are in normal range, SCM will be adjusting the duty rate of PWM signal by comparing the actual value with the setting value of voltage, current or power, to regulate the power output due to users' requirements. If abnormal voltage or current is detected, the system enters fault-processing mode. Abnormal voltage/current situations include over-voltage, under-voltage, over-current and under-current, and the corresponding fault-processing procedures are: if over-voltage fault is detected, control bypass circuit 4 regulates the output voltage to input voltage level, and then gives out a bypass signal to make the power supply device enter bypass mode, that is, close K1, K2, K3, and power supply device quits energy saving mode, energy is provided by bypass switch K3; after voltage and current level resume at allowed range, power supply device resumes the energy-saving function, that is, close K3, embedded program starts working; the operation in under-voltage situation is the same as in over-voltage situation; if under-current situation happens, the default processing of program is shutting down the backend loads, power supply device quits energy-saving operation and enters hibernating status. Power supply is provided through K3 bypass circuit. At the same time, control circuit 4 gives out a signal to shut down IGBT module. External operation is not affected under such situation; when current raises and exceeds the limit value (this value is set by user according to the on-site condition), power supply device wakes up and starts saving energy. The input of temperature circuit 41 is connected to the IGBT module and the heat sink attached, while its output is connected to the output of SCM 42. When temperature detected exceeds the first setting value, 45 degree Celsius for example, fan 3 is activated to reduce the temperature until the temperature is below 35 degree; when the detected temperature exceeds the third setting value, 75 degree for example, control circuit gives out a signal to force power supply device enter soft bypass mode, and K3 is closed with K1 and K2 closed, the power energy is provided to load through K3 bypass; only environment temperature is detected to be under the second setting value, 50 degree for example, power supply device restore energy-saving operation. When temperature exceeds third setting value for three times and device quits energy saving operation for three times, air cooling system fault is identified, and power supply device will quit working immediately and provides energy to load through K3 bypass; and power supply device will no longer resume energy-saving operation.

Voltage sampling filter circuit 44, current sampling filter circuit 45, temperature detection circuit 41 and A/D conversion circuit 43 of this invention are accomplished by applying standard circuits. Temperature detection circuit 41 uses digital temperature sensor, for samples DS18B20 communicates with SCM 42 directly.

The lighting power supply device of this invention is connected to the transformer of the lighting load or the switch cabinet that controls the lighting load. After the output of power supply units is connected to the lighting load, the control circuit 4 operates intelligently with the configuration of the dynamic energy-efficient lighting software embedded on SCM 42. A programmable processing function with user interface designed for users to setup their requirements is configured with the flexible energy-saving lighting power software on the system. The "voltage-time or time-illumination, power-time" functional table may be setup by users and automatically executes according to user's pre-set time schedule for day(s) and season. And further, this user requirements function can amend and save the "voltage-time or time-illumination, power-time" schedules and therefore to achieve the flexible adjustments and different scenarios for energy saving at different sites and different sections of the power grid. When the "voltage-time or time-illumination, power-time" functional table is changed according to user settings, the control circuit 4 will change the PWM signal duty cycle which enables the adjustment of High-frequency chopper duty cycle D which will bring the result of controlling the power conditioning circuitry 7 to regulate and maintain constant current, constant voltage and constant power supply. When the defect fault is discovered, the control circuit 4 will send signal and instruct the power supply out of energy-saving mode, and bypass to the lighting system power supply as to ensure uninterrupted power supply of lighting load. And therefore achieves the goal of power supply optimization, efficiency and user-friendly and programmable control of power distribution system; And further protect lighting equipments from harmful over-voltage and power surge as well.

It claims:

1. A programmable high voltage energy saving system comprising:
    an over-voltage protection circuit including a first level protection circuit comprising a first piezoresistor and a second piezoresistor connected in series and having a common terminal connected to ground, and a first discharge tube and a second discharge tube, the first discharge tube connected in series to the non-grounded terminal of the first piezoresistor and the second discharge tube connected in series to the non-grounded terminal of the second piezoresistor, and a second level protection circuit comprising a series connected resistor and capacitor connected in parallel to a first transient voltage suppression diode, the second level protection circuit connected to the first level protection circuit in parallel, a first inductor connected between the first discharge tube and a first terminal of the first transient voltage suppression diode and a second inductor connected between the second discharge tube and a second terminal of the first transient voltage suppression diode;

a power regulation circuit comprising an IGBT module and a capacitor connected in parallel to the first transient voltage suppression diode and to the input of the IGBT module, and an output protection circuit connected in parallel to the output of the IGBT module, the IGBT module comprising a high frequency chopper including a first IGBT and a second IGBT and a power frequency continued current tube including a third IGBT and a fourth IGBT, the collectors of the first and second IGBTs connected to respective ends of the capacitor, the emitters of the first and second IGBTs connected to the collectors of the third and fourth IGBTs respectively, a first diode and a second diode, the anodes of the first and second diodes anti-parallel connected to the collectors of the first and second IGBTs respectively, a third and a fourth diode, the emitters of the third and fourth IGBTs forward connected in series to the third and fourth diode respectively, and the output protection circuit comprising a second transient voltage suppression diode connected in parallel to an LC filter circuit;

a control circuit connected to the power regulation circuit comprising a pulse width modulation driver module connected to a single chip machine, the high frequency output ports of the pulse width modulation driver module connected to the gates of the first and second IGBTs and the power frequency output ports of the pulse width modulation driver module connected to the gates of the third and fourth IGBTs;

an auxiliary power module connected to a power supply input of the control circuit;

a series communication module connected to the control circuit; and a user interface connected to the control circuit.

2. The programmable high voltage energy saving system of claim 1, wherein the control circuit further comprises a detection protection circuit having a fault bypass circuit, a voltage sampling filter circuit, a current sampling filter circuit and a temperature detection circuit, the fault bypass circuit comprising a first switch, a second switch and a third switch, the first and second switches connected to the input and output of the power regulation circuit respectively, the third switch connected across the input of the first switch and the output of the second switch, the voltage sampling filter circuit connected at its input to the output of the power regulation circuit, the current sampling filter circuit connected at its input to the output of the second switch, the outputs of the voltage sampling filter circuit and the current sampling filter circuit connected to inputs of the single chip machine through an A/D converter, and the temperature detection circuit connected at its input to the power regulation circuit and at its output to an input of the single chip machine.

3. The programmable high voltage energy saving system of claim 1, wherein the control circuit further comprises an electricity leakage switch, a first terminal of the electricity leakage switch connected to the input of the first switch and a second terminal of the electricity leakage switch connected to the input of the auxiliary power module.

* * * * *